INVENTOR.
BJORN F. FLODEN

United States Patent Office 3,282,485
Patented Nov. 1, 1966

3,282,485
ACCELERATION AND SPEED CONTROL DEVICE
Bjorn F. Floden, Palmyra, N.J., assignor to Radio Corporation of America, a corporation of Delaware
Filed July 24, 1964, Ser. No. 384,998
10 Claims. (Cl. 226—169)

This invention relates to a device for quickly accelerating a rotating shaft from standstill to a running speed and for assisting in keeping the speed of said shaft constant after it has attained its running speed. This device is particularly useful for quickly accelerating the sound drum of a talking motion picture projector to full running speed when the projector is put into operation and for thereafter assisting in keeping the speed of the sound drum constant in spite of the tendency to undesired changes of speed thereof induced by variations in the rate of motion of the moving picture film.

In talking motion picture equipment, the film after it has left the film gate, passes over a sound drum and then to a sound sprocket. The sound is reproduced from the sound track on the film while the film is in contact with the sound drum, the rate of advance of the film being controlled by the speed of rotation of the sound drum. To prevent distortion of the sound, the sound drum should rotate at a uniform speed. A flywheel is coupled to the sound drum to assist in keeping the speed of rotation of the sound drum uniform.

The sound drum (and its flywheel) is caused to rotate by frictional engagement of the surface thereof with the film. When the sound drum is rotated by the film from standstill, a noticeable period of time is required to bring the sound drum up to its running speed. Thus, the sound produced by the projector may be distorted during starting. Also, great strain, which may rupture the film, is put on the film during starting. Also, as the film driving mechanism reaches its correct speed much quicker than the sound drum does, the film will slip over the sound drum surface during acceleration of the sound drum. The slippage of the film on the drum may cause damage to the film picture area, degrading the reproduced picture. Furthermore, if, during the running of the film, the loop of film between the film gate and the sound drum becomes too short, a loop setting device is put into operation to pull the film sufficiently to provide a loop of film of proper size between the film gate and the sound drum. Action of the loop setter causes momentary pulling on the film and therefore momentary slowing thereof and of the sound drum. Operation of the loop setter also moves the film motion damper commonly employed in such equipment. While the damper is working its way back to its normal position, it may pull the film too fast, thereby speeding up the drum. Passage of a film splice over the sound drum may also cause disturbance of the rotational speed of the drum. Any disturbance in the speed of the sound drum causes annoying sound distortion.

It is an object of this invention to provide an improved device for speeding up the sound drum of a talking motion picture equipment upon start thereof.

It is a further object of this invention to provide a device which speeds up the sound drum of the projector equipment and which thereafter acts to keep the speed of the sound drum constant in spite of irregularities in the speed of flow of the film in contact with the sound drum.

In accordance with this invention, friction wheels are provided on the respective shafts of the sound sprocket and of the sound drum of the projector equipment. The shaft carrying the sound drum also has a flywheel fixed thereto. When the equipment is turned on, an idler wheel or puck is squeezed tightly into contact with both of these friction wheels. The rotation of the sound sprocket shaft is transferred to the sound drum shaft by means of the puck, thereby bringing the speed of the flywheel up very close to the running speed thereof without depending on the pull of the film to start and accelerate the rotation of the flywheel. After the flywheel has arrived at very close to its running speed, the force squeezing the puck into contact with the friction wheels is reduced. The friction wheels are then only lightly coupled by the puck and a slight drag is put on the flywheel friction wheel, tending to prevent overspeed of the sound drum. If desired, when the equipment is idle, the puck may be moved out of contact with both of the friction wheels to prevent formation of flats on the contacting peripheries thereof.

The novel features of this invention, both as to its organization and method of operation, as well as additional objects and advantages thereof, will be understood more readily from the following description, when read in conjunction with the accompanying drawing, in which.

Figure 1:
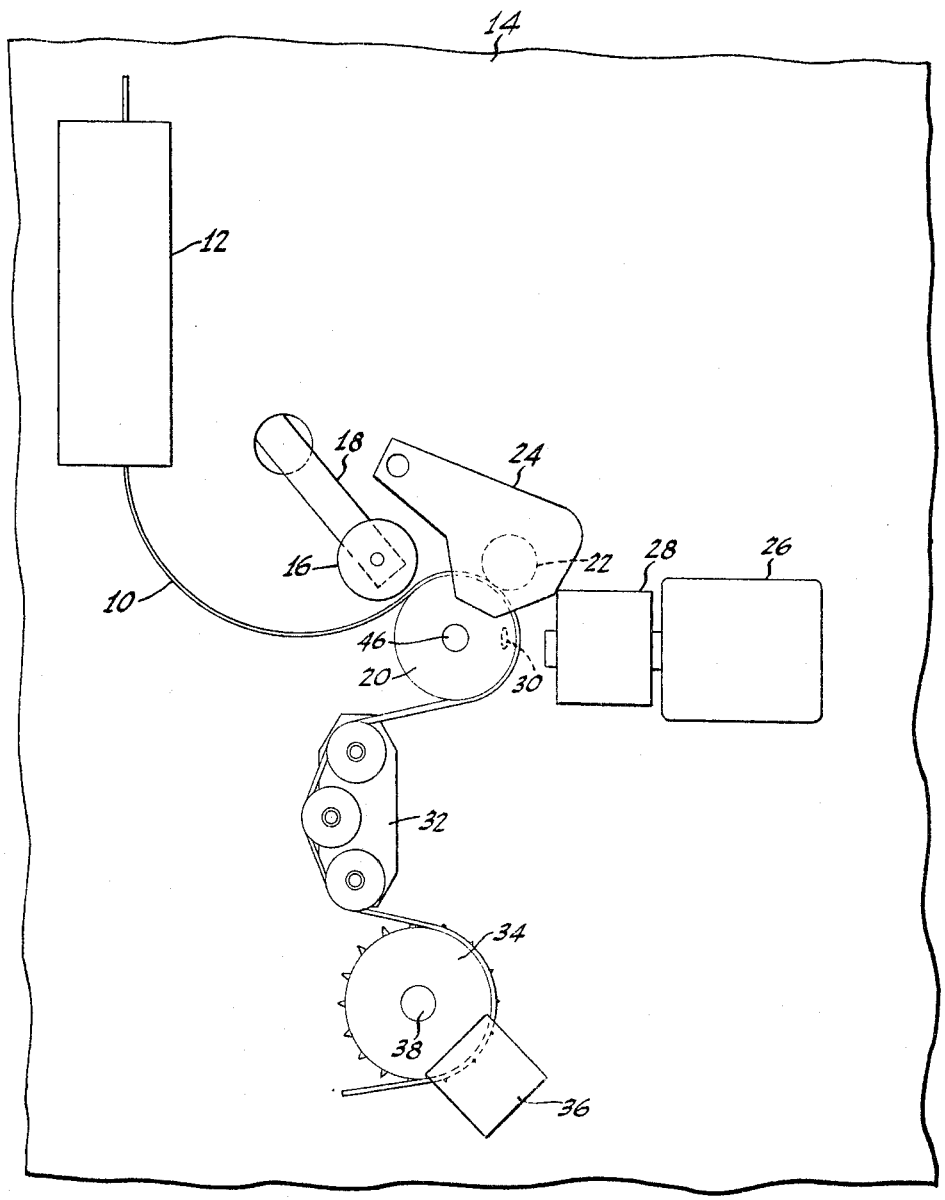
FIGURE 1 is a partial, front elevational view of a projector equipment in which the device of this invention is included.

Referring, first, to FIG. 1, there is shown a sound-picture film 10 which is fed intermittently, in known manner, down through a film gate 12 supported on a support panel 14, and then below but not normally in contact with a roller 16 of a loop setter 18, and in contact with a sound drum 20. A pressure roller 22, supported by a swingable support 24, holds the film 10 against the sound drum 20, the sound track area of the film 10 overhanging the sound drum 20 in a direction toward the panel 14. Light from an exciter lamp 26 is projected through the sound track by means of a lens system 28 onto a photosensitive cell 30 that is mounted on the other side of the sound track from that facing the lamp, whereby the sound track modulates the light passing therethrough to the photosensitive device 30. The film 10 continues over a yieldably mounted, rotatable, film motion damper 32 and around a sound sprocket 34 against which it is held by a shoe 36, and eventually to a takeup reel (not shown).

Figure 2:
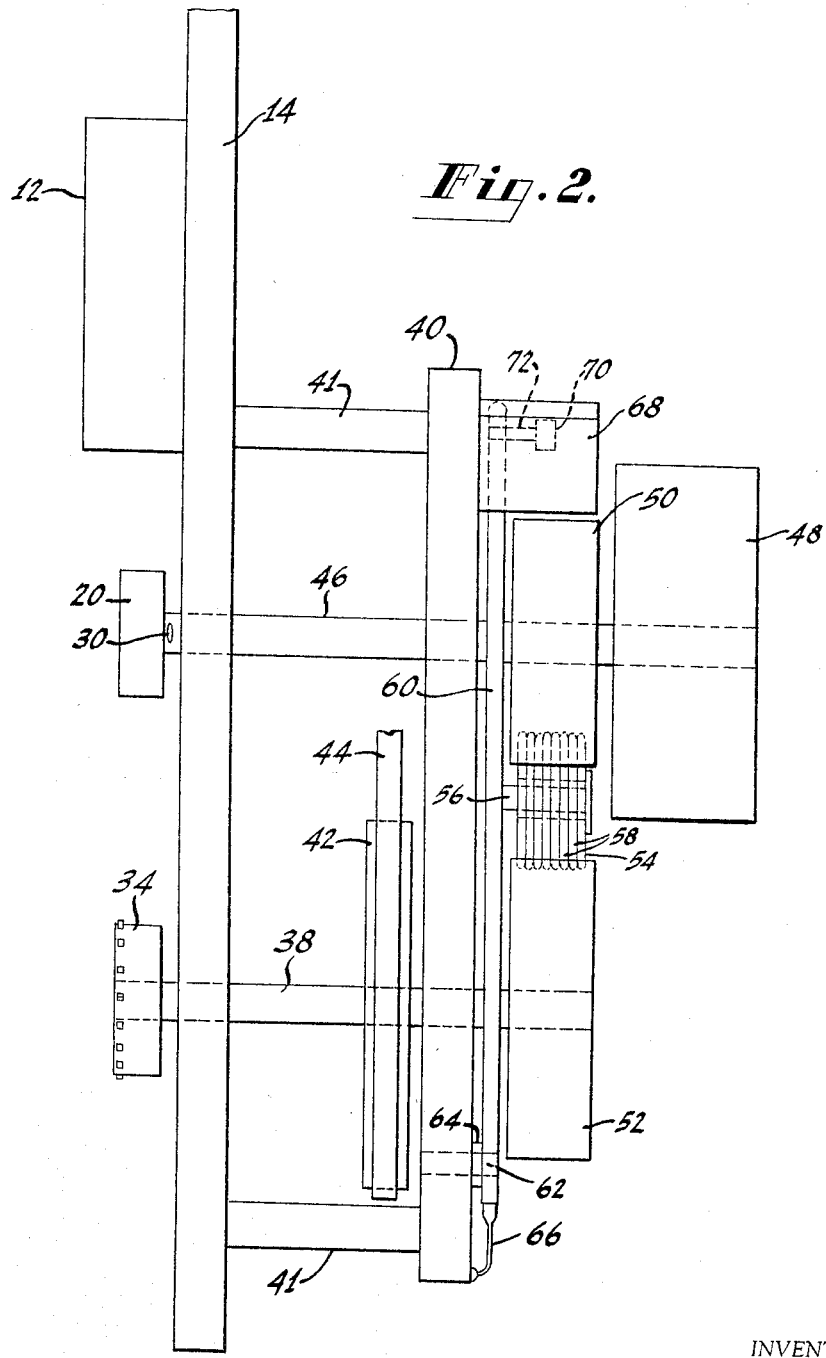
FIGURE 2 is a partial, side elevational view of projection equipment including the device of this invention, parts being omitted for clarity.

As shown in FIG. 2, the sound sprocket 34 is mounted on a shaft 38 which extends through the panel 14 and also through an auxiliary support plate 40 which is supported on the panel 14 and spaced therefrom by spacers 41. A pulley 42 of the timing belt type is fixedly mounted on the shaft 38, the pulley 42 being driven from a main projector motor (not shown) through suitable speed reduction means (not shown) by means of a timing belt 44. The intermittent feed device at the gate 12 is also positively driven by the projector motor in a known manner. As shown in FIG. 2, the sound drum 20 is fixed to a shaft 46 which is free to turn in the front panel 14 and in the auxiliary support plate 40, a flywheel 48, shown as a rectangular bar, being fixed to the shaft 46 and tending to keep rotational speed of the shaft 46 constant. No drive (except as noted below) and except the contact of the film 10 with the sound drum 20, is provided for driving the sound drum 20 during running of the projector equipment.

When the projector equipment is started, in the absence of the acceleration and speed control device to be described, the intermittent feed device of the film gate 12 and the sound sprocket 34, which are both positively driven, almost immediately operate at normal speed, but the sound drum 20 is customarily brought up to speed by friction of the film therewith. Until the sound drum 20 is brought up to operating speed, the film 10 slips over the sound drum 20 and therefore may move at a nonuniform rate past the photosensitive cell 30, whereby sound distortion results during starting. Furthermore, if the loop of film 10 between the gate 12 and the sound drum 20 becomes too small, due usually to bad sprocket holes in the film, whereby the loop setter 16 is raised to an extreme right hand position, as viewed in FIG. 1, a solenoid (not shown) is energized, as is well known in the art, to cause quick motion of the loop setter arm 18 to its extreme left hand position, pulling film through the film gate 12 as the pull down claw thereof (not shown) makes its return stroke. The film is tightened between the film gate 12 and the sprocket wheel 34 due to the friction of the film in the film gate. Tightening the film causes the film motion damper 32 to rotate counterclockwise about the axis of its uppermost roller, as viewed in FIG. 1. The result of this action is to apply a force to the sound drum 20 that tends to slow it down. Furthermore, when the damper 32 moves back to its normal position, it tends to speed up the film 10 momentarily, and with it the sound drum 20. Also, spliced portions of the film, in their passage over the sound drum 20, disturb the rotational rate of the sound drum 20. Any disturbance in the uniform speed of the sound drum 20 causes distortion of the sound produced by the equipment.

Means are provided for quickly starting the sound drum 20 and for stabilizing the speed thereof after it has been brought up to operating speed. This means comprises a pair of frictional wheels 50 and 52 (FIGS. 2 and 3) having registering peripheries, one (50) thereof being fixed for rotation with the shaft 46 of the sound drum 20 and the other (52) thereof being fixed for rotation with the shaft 38 of the sound sprocket 34. The wheels 50 and 52 are mounted on their respective shafts 46 and 38 to the right of the auxiliary plate 40, as viewed in FIG. 2. The start-up means also comprises a cylindrical puck 54 mounted for rotation on a pin 56 which loosely fits an axial hole through the puck 54. A plurality of resilient O-rings 58 are mounted on the circumference of the puck. The purpose of the loose fit of the puck on its pin 56, of the O-rings 58, and of the friction wheels 50 and 52 is explained below.

Figure 3:
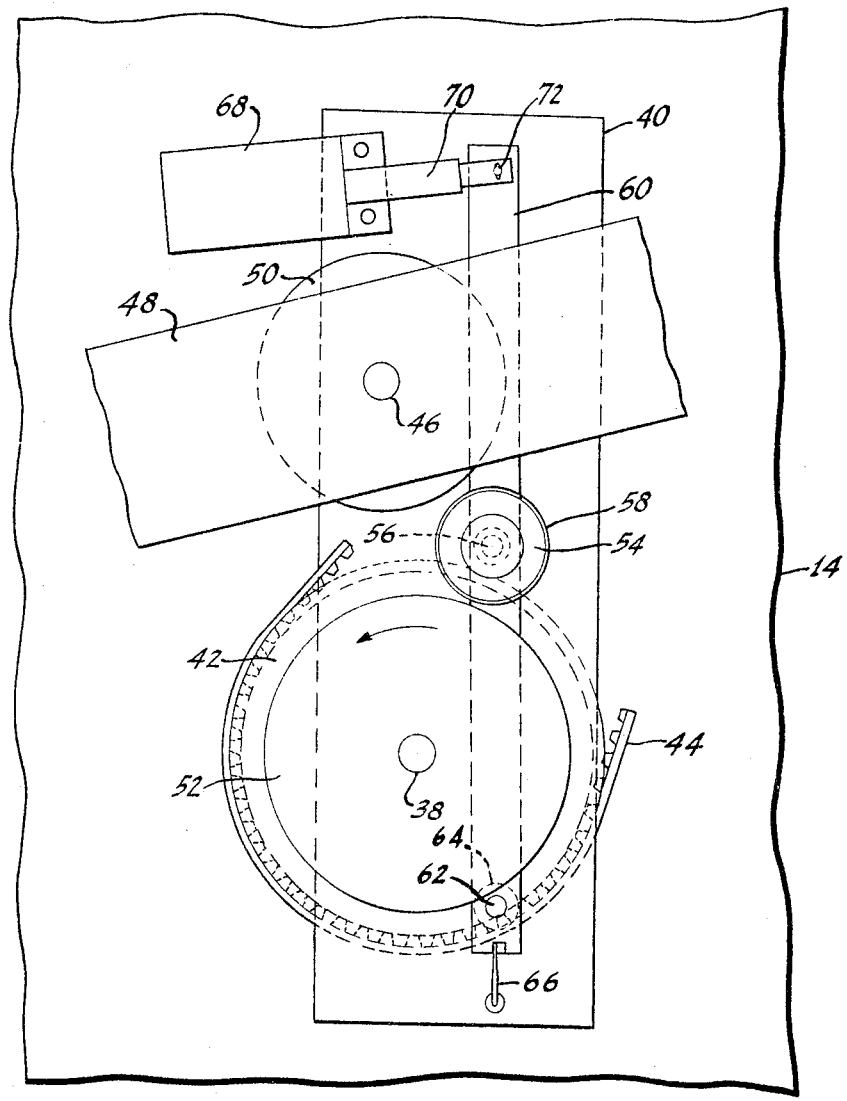
FIGURE 3 is a partial, rear elevational view of the projection equipment of FIG. 2.

The pin 56 extends laterally from a midpoint of a lever 60, the lower end of which, as viewed in FIGS. 2 and 3, is pivoted on the auxiliary frame 40 by means of a pin 62 and a spacer 64. A leaf spring 66, one end of which is anchored on the auxiliary plate 40, is so attached to the lever 60 as to urge clockwise rotation thereof, as viewed in FIG. 3. A solenoid 68 is mounted on the auxiliary plate 40, the armature 70 of the solenoid being connected to the lever 60, near the top thereof, by a pin 72. The solenoid 68 is so constructed and disposed that, when it is energized, it rotates the lever 60 against the urging of the spring 66.

The diameters of the two friction wheels 50 and 52 are so chosen that their peripheries are closer together than the diameter of the puck 54. These diameters are also so chosen that, when the puck 54 is in contact with both of the friction wheels 50 and 52, the shaft 38 rotating at its normal speed, and no slipping occurring at the contacting surfaces, the sound drum shaft 46 runs at from 98 to 99% of its normal speed. Normal or operating speed may be defined as the rotational speed of the shaft 46 when the peripheral speed of the surface of the sound drum 20 and the average running linear speed of the film 10 in contact therewith is the same. The contacting portions of the puck 54 and the wheel 52 move in a direction towards a line joining the shafts 46 and 38 whereby driving engagement of the puck 54 and the wheel 52 wedges the puck tightly and non-slippingly between the friction wheels 50 and 52. The spring 66 urges the puck 54 out of engagement with both of the friction wheels 50 and 52.

Figure 4:
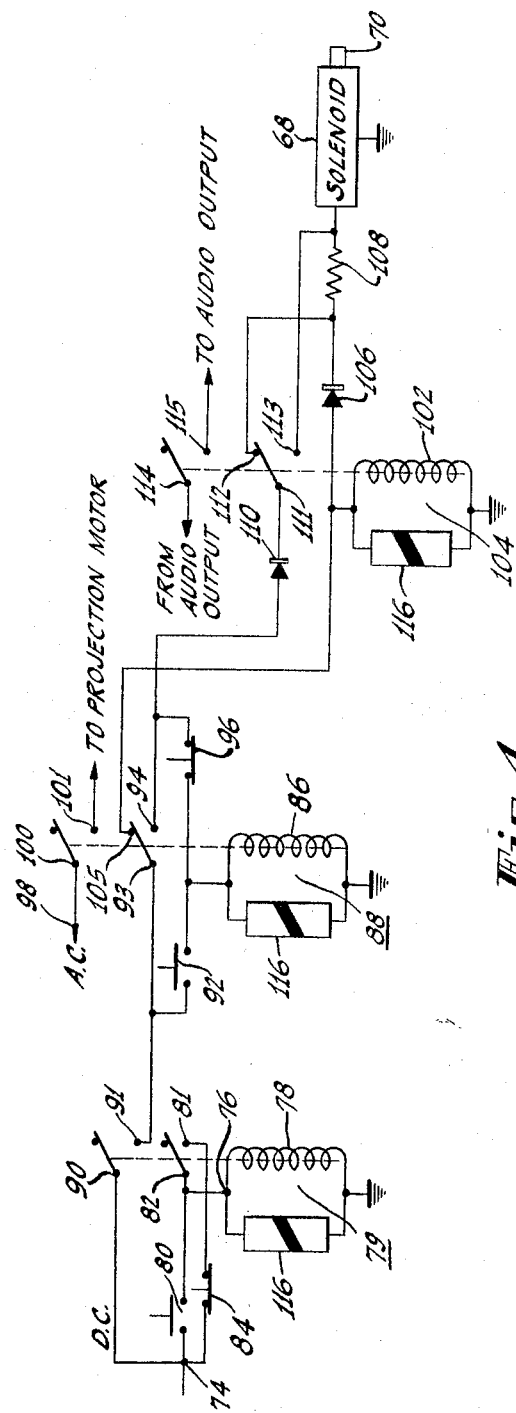
FIGURE 4 is a wiring diagram of a circuit suitable for the projector equipment of several figures.

A suitable circuit for the above described apparatus is shown in FIG. 4. One terminal 74 of a source (not shown) of direct current (D.C.) is connected to a terminal 76 of the coil 78 of a standby relay 79 through a normally open "on" switch 80 and to one terminal 81 of a pair of hold terminals 81, 82 for this relay 79 through a normally closed "off" switch 84. The other 82 of the hold terminals is connected to the D.C. source terminal 74 through the "on" switch 80. The other terminal of the relay coil 78 is connected to ground. The terminal 74 of the D.C. source is also connected to one terminal of the coil 86 of a run relay 88 through another pair of normally open contacts 90, 91 of the standby relay 79, and through a normally open run switch 92 in series, the other terminal of the coil 86 of the run relay 88 being connected to ground. The terminal 74 of the D.C. source is also connected to the contact 93 of a pair of hold contacts 93, 94 of the run relay 88 through the contacts 90, 91, the other hold contact 94 being connected to the first mentioned terminal of the coil 86 of the run relay 88 through a normally closed motor "stop" switch 96. The projector main or projection motor (not shown) is electrically connected to one terminal 98 of an alternating current (A.C.) supply (not shown) through another pair of normally open contacts 100, 101 of the run relay 88. One terminal of the coil 102 of a slow to release relay 104 is connected to a further contact 105 of the run relay 88, the contact 105 being normally connected to the contact 93. This contact 105 is also connected to a terminal of the solenoid 68 through a rectifier 106 which may be a diode and a resistor 108 in series, the other terminal of the solenoid 68 being grounded.

The contact 94 of the run relay 88 is also connected through a second diode 110 and a pair of normally closed contacts 111 and 112 of the relay 104 to the ungrounded contact of the solenoid 68 through the resistor 108. Another contact 113 of the relay 104 is connected directly to the ungrounded terminal of the solenoid 68. A further set of normally open contacts 114, 115 of the solenoid relay 104 are connected across the audio output of the projector equipment. Varistors 116, which have a high resistance for low voltage and low resistance for high voltage applied thereacross, may be connected across the coils of each of the several relays to protect the accompanying sound system from high voltage transients.

When no power is applied to the projector, no voltage is applied to the solenoid 68, whereby the puck 54 is held out of engagement with the friction wheels 50 and 52 by the spring 66, so that no flats may develop in the O-rings 58 or in the friction wheels 50 and 52. When the projector is put into standby condition by closing the "on" switch 80 momentarily, a circuit is completed for energizing the standby relay 79, closing both of its set of contacts 81–82 and 90–91, thereby completing a hold circuit for the standby relay 79 (which may be broken by opening the "off" switch 84 momentarily). Voltage is also applied to the coil 102 of the slow to release relay 104, energizing it, and is also applied to the solenoid 68 through the diode 106 and the resistance 108 in series, through the closed contacts 90–91 of the standby relay 79, and through the contacts 93–105 of the run relay 88. The solenoid 68 is energized by a reduced voltage due to the voltage drop in the resistor 108, whereby it urges the puck 54 lightly against the two friction wheels 50 and 52. The motion of the armature 70 of the solenoid 68 is stopped a short distance from the extreme end of its travel into the solenoid coil by contact of the O-rings 58 on the puck 54 with the two friction wheels 50 and 52 when the solenoid 68 is energized with a reduced voltage. When the relay 104 is energized, the contacts 114–115 leading to the audio output (not shown) are closed, short-circuiting the audio output of the projector. The polarity of the two diodes 106 and 110 is such as to prevent undesired application of voltage to the run relay 88 through the closed contacts 111, 113.

Upon closing the run switch 92 momentarily, a hold circuit is set up for the run relay 88 through its hold contacts 93–94, and, at the same time, the voltage supply circuit to the relay 104 is broken. Being a slow to release relay, the relay 104 continues to hold for a fraction of a second and direct current is supplied to the solenoid 68 through the hold contacts 93–94 and through the diode 110 and the contacts 111–113 of the relay 104, by-passing the resistor 108. The diodes 110 and 106 prevent undesired operation of the relay 104. The motor contacts 100, 101 are also closed to apply voltage to the projector motor (not shown).

The full supply voltage is applied to the solenoid 68 when the run relay 88 is energized and continues to be applied to the solenoid 68 until the slow to release relay 104 releases, whereby the armature 70 of the solenoid 68 moves further into the solenoid 68 coil. The puck 54 is jammed into substantially non-slipping contact with the two friction wheels 50 and 52, compressing the O-rings 58. As the motor speeds up, driving the friction wheel two friction wheels 50 and 52, compressing the O-rings 58. As the motor speeds up, driving the friction wheel counter-clockwise, as viewed in FIG. 3, the puck 54 is jammed into contact with the two friction wheels 52 and 50 more tightly, whereby the friction wheel 50 and the flywheel 48 and the sound drum 20 mounted on the shaft 46 are brought up to 98 to 99% of their running speed in synchronism with the bringing up to running speed of the film feed means. At the expiration of the time that it takes the slow to release relay 104 to release, the contacts thereof take their de-energized positions at which the short circuit is removed from the audio output of the equipment, and voltage is fed to the solenoid 68, through the contacts 111 and 112 and through the resistor 108, to apply reduced voltage to the solenoid 68 and therefore to apply reduced, run pressure to the puck 54. It will be noted that run pressure and the standby pressure on the puck 54 are equal. The fit of the puck 54 on its pin 56 is sufficiently loose so that the puck may take and maintain its position in contact with both friction wheels as the lever 60 is rotated counter-clockwise by the armature of the solenoid 68.

When the speed of the drum 20 is increased to 100% of its running speed by the film 10, the surface of the wheel 50 will be moving faster than the surface of the puck 54, and the puck 54 will therefore be urged out of tight contact with the friction wheels 50 and 52. However, the puck 54 will remain in running contact with the wheels 50 and 52 due to light energization of the solenoid 68. The puck 54 will therefore apply a slight frictional drag on the friction wheels 50 and 52. If, for some reason, such as slowing the flow of film 10 during the loop setting, the sound drum 20 is slowed down to below 98 to 99% of its running speed, the puck 54 will immediately tightly contact both wheels 50 and 52 and speed up the sound drum 20 and maintain it at 98 to 99% of its running speed until the film again drives the drum at its running speed. If the film 10 is pulled too fast, as by the return motion of the film damper 32 (or for any other reason), thereby causing the sound drum 20 to speed up, the friction of the puck 54 on the wheel 50 will tend to slow it down. Therefore, the puck 54 acts not only to bring the sound drum 20 up to its running speed very quickly, but also to keep the speed of the sound drum 20 very constant during running of the projector.

It will undoubtedly be apparent to those skilled in the art that variations in the embodiment described are possible within the spirit of the present invention. Hence, it should be understood that the foregoing description is to be considered as illustrative and not in a limiting sense.

What is claimed is:

1. A device for raising the speed of a shaft close to but less than a predetermined rotational speed and for applying a drag to said shaft when it attains said predetermined speed, said device comprising
    (a) a first friction wheel mounted on said shaft,
    (b) frictional drive means tending to rotate said first mentioned shaft at said predetermined speed,
    (c) a power driven shaft,
    (d) a second friction wheel mounted on said power driven shaft,
    (e) a rotationally mounted puck for engagement with said friction wheels, the ratio of the diameters of said friction wheels being such that, when the periphery of said puck non-slippingly engages the peripheries of said friction wheels, said first shaft will be driven at less than, but close to, said predetermined rotational speed by said power driven shaft, and
    (f) means for non-slippingly engaging the periphery of said puck with the peripheries of said friction wheels and for slippingly engaging the periphery of said puck with the peripheries of said friction wheels at different times, whereby the rotational speed of said first shaft will be slowed down if it exceeds said predetermined speed.

2. A device for raising the speed of a shaft close to but less than a predetermined rotational speed and for applying a drag to said shaft when it attains said predetermined speed, said device comprising
    (a) a friction wheel mounted on said shaft,
    (b) a power driven shaft,
    (c) a friction wheel mounted on said power driven shaft,
    (d) a rotationally mounted puck for engagement with said friction wheels, the ratios of the diameters of said friction wheels being such that, when the periphery of said puck non-slippingly engages the peripheries of said friction wheels, said first shaft will be driven at less than, but close to, said predetermined rotational speed by said power driven shaft,
    (e) energizable solenoid means for bringing the peripheries of said puck and said wheels into engaging relation, and
    (f) means for variably energizing said solenoid so as to render said engaging relation at times substantially non-slipping and at other times slipping.

3. In an apparatus for feeding a film in frictional contact with a sound drum by means of a film feed sprocket, the combination of
    (A) a first rotatable shaft having said sound drum and a fly wheel means mounted thereon,
    (B) a second rotatable shaft having said film feed sprocket mounted thereon,
    (C) power means for driving said second shaft at a speed at which film advanced by said feed sprocket causes said drum to rotate at a predetermined rotational speed by friction of said film with said drum, and
    (D) means for rapidly bringing said sound drum nearly up to said predetermined rotational speed during initial rotation thereof, and for applying a drag to said drum when its speed is equal to or greater than said predetermined rotational speed, said last mentioned means comprising
        (a) a first friction wheel mounted on said first shaft,
        (b) a second friction wheel mounted on said second shaft in proximity to said first friction wheel,
        (c) a rotatable puck disposed for cooperation with said friction wheels by engagement therewith, the ratio of the circumferences of said friction wheels being such that, when the periphery of said puck is in non-slipping engagement with the peripheries of said friction wheels said first shaft will be driven at close to, but below, said predetermined rotational speed, and (d) means for effecting non-slipping engagement of the periphery of said puck with the peripheries both of said friction wheels at the start of rotation of said second shaft and for effecting slipping engagement of said puck with the peripheries of both of said friction wheels after rotation of said second shaft has been started, whereby said sound drum is brought quickly up to nearly said predetermined rotational speed and a frictional drag is applied thereto during rotation at said predetermined rotational speed.

4. In apparatus for feeding a film in frictional contact with a sound drum by means of a film feed sprocket, the combination of
   (A) a first rotatably mounted shaft having a film sound drum and flywheel means mounted thereon,
   (B) a second rotatably mounted shaft having a film feed sprocket mounted thereon,
   (C) power means for driving said second shaft at a speed at which film advanced by said feed sprocket causes said drum to rotate at a predetermined rotational speed by friction of said film in contact with said drum, and
   (D) means for rapidly bringing said sound drum nearly up to said predetermined rotational speed during initial rotation thereof, and for applying a drag to said drum when its speed is equal to or greater than said predetermined rotational speed, said last-mentioned means comprising
      (a) a first friction wheel mounted on said first shaft,
      (b) a second friction wheel mounted on said second shaft in proximity to said first friction wheel,
      (c) a rotatable puck disposed for cooperation with said friction wheels by engagement therewith, the ratio of the circumferences of said friction wheels being such that, when the periphery of said puck is in non-slipping engagement with the peripheries of said friction wheels, said first shaft will be driven at close to, but below, said predetermined rotational speed, and
      (d) variably energizable solenoid means for effecting non-slipping engagement of the periphery of said puck with the peripheries of both of said friction wheels at the start of rotation of said second shaft responsive to full energization of said solenoid and for effecting slipping engagement of said puck with the peripheries of both of said friction wheels after starting rotation of said second-mentioned in response to light energization of said solenoid, whereby said sound drum is brought quickly up nearly to said predetermined rotational speed and a frictional drag is applied thereto during rotation of said predetermined rotational speed.

5. In combination,
   (a) a rotatably mounted shaft having a drum and a first friction wheel mounted thereon,
   (b) a second rotatably mounted shaft having a rotatable film feed means and a second friction wheel mounted thereon in proximity to said first friction wheel, said film feed means engaging said film to feed it in a forward direction, said film frictionally contacting said drum to cause rotation thereof,
   (c) means for driving said second shaft at a rotational speed at which a film advanced by said film feed means and frictionally contacting said drum will cause said drum to rotate at a predetermined speed,
   (d) a rotatably mounted puck for engagement with said friction wheels, the ratio of the diameters of said friction wheels being such that, upon non-slipping engagement of the periphery of said puck with the peripheries of said friction wheel, said first friction wheel will be driven at less than, but close to, said predetermined rotational speed, and
   (e) means for moving said puck into substantially non-slipping engagement with both of said friction wheels whereby said first shaft is brought close up to said predetermined speed, and for holding the periphery of said puck in slipping engagement with the peripheries of both of said friction wheels at other times whereby a drag is applied to said first-mentioned shaft when it is rotating at least at said predetermined speed.

6. In an apparatus for feeding a film in frictional contact with a sound drum by means of a rotatable film feed sprocket, the combination of
   (a) a first rotatably mounted shaft having said drum and a first friction wheel mounted thereon,
   (b) a second rotatably mounted shaft having said rotatable film feed sprocket mounted thereon and also a second friction wheel mounted thereon in proximity to said first friction wheel,
   (c) means for driving said second shaft at a rotational speed at which a film advanced by said film feed sprocket and frictionally contacting said drum would cause said drum to rotate at a predetermined speed,
   (d) a pivotally mounted lever,
   (e) a puck rotatably mounted on said lever for engagement with said friction wheels, the ratio of the diameters of said wheels being such that, upon non-slipping engagement of the periphery of said puck with the peripheries of said friction wheels, said first friction wheel will be driven at close to, but less than, said predetermined rotational speed, and
   (f) a variably energizable solenoid having an armature connected to said lever to rotate it about its pivot for moving said puck into substantially non-slipping engagement with both of said friction wheels in response to full energization of said solenoid whereby said first-mentioned shaft is brought close up to said predetermined speed, and alternatively for holding the periphery of said puck in slipping engagement with the peripheries of both of said friction wheels in response to light energization of said solenoid whereby a drag is applied to said first-mentioned shaft when it is rotating at least at said predetermined speed.

7. In apparatus for feeding a film in frictional engagement with a sound drum by means of a rotatable film feed sprocket, the combination of
   (a) a first rotatably mounted shaft having said drum and a friction wheel mounted thereon,
   (b) a second rotatably mounted shaft having said rotatable film feed sprocket mounted thereon and also a second friction wheel mounted thereon in proximity to said first friction wheel,
   (c) means for driving said second shaft at a rotational speed at which a film advanced by said film feed sprocket and frictionally contacting said drum will cause said drum to rotate at a predetermined speed,
   (d) a pivotally mounted lever,
   (e) a puck rotatably mounted on said lever for engagement with said friction wheels, the ratio of the diameters of said wheels being such that, upon non-slipping engagement of the periphery of said puck with the peripheries of said friction wheels, said first mentioned friction wheel will be driven at close to, but less than, said predetermined rotational speed,
   (f) a variably energizable solenoid having an armature fixed to said lever to rotate it about its pivot for moving said puck into engagement with both of said friction wheels, and
   (g) means for applying a full energizing voltage to said solenoid to move said puck into non-slipping engagement with both of said friction wheels, whereby said first shaft is brought close up to said predetermined speed, and for alternatively applying light energizing voltage to said solenoid to move said puck into slipping engagement with the peripheries of both of said friction wheels whereby a drag is applied to said shaft when it is rotating at least at said predetermined speed.

8. Apparatus for raising the speed of a shaft up to less than, but close to, a predetermined rotating speed and for applying a drag to said shaft when it attains said predetermined speed, said apparatus comprising, in combination,
(a) a first friction wheel mounted on said shaft,
(b) frictional drive means tending to rotate said first mentioned shaft at said predetermined speed,
(c) a power driven shaft,
(d) a second friction wheel mounted on said power driven shaft in proximity to said first friction wheel,
(e) a rotationally mounted puck for engagement with said friction wheels, the ratio of the diameters of said friction wheels being such that, upon non-slipping engagement of the periphery of said puck with the peripheries of said friction wheels, the first-mentioned shaft will be driven at less than, but close to, said predetermined rotational speed by said power driven shaft, and
(f) means for effecting non-slipping engagement of said puck with the peripheries of said wheels and for alternatively effecting slipping engagement of the periphery of said puck with the peripheries of said friction wheels, the direction of motion of the engaging portions of said puck and of said second friction wheel being towards a line joining the axes of said shafts, whereby the rotational speed of said first mentioned shaft will be slowed down if it exceeds said predetermined speed.

9. In apparatus for feeding film in frictional engagement with a sound drum by means of a film feed sprocket, the combination of
(a) a first rotatable shaft having said sound drum and a flywheel mounted thereon,
(b) a second rotationally mounted shaft having said film feed sprocket mounted thereon.
(c) power means for driving said second-mentioned shaft and said film feed sprocket mounted thereon at a speed at which said drum is rotated at a predetermined rotational speed by frictional contact of said film with said drum,
(d) means for rapidly bringing said sound drum to a rotational speed that is nearly up to said predetermined rotational speed and for applying a drag to said drum when its speed is equal to or greater than said predetermined rotational speed, said means comprising
 (1) a first friction wheel mounted on said first shaft,
 (2) a second friction wheel mounted on said second shaft in proximity to said first friction wheel,
 (3) a puck mounted for engagement with both of said friction wheels, the ratio of the circumferences of said friction wheels being such that, upon non-slipping contact of said puck with said friction wheels, said first mentioned shaft will be driven at close to, but below, said predetermined rotational speed, and
 (4) means for effecting non-slipping engagement of the said puck with both of said friction wheels at the start of rotation of said second shaft and for effecting slipping engagement of said puck with both of said friction wheels after the start of rotation of said second-mentioned shaft, the direction of motion of the contacting portions of the said puck and said second friction wheel being towards a line joining the axes of said shafts,
whereby said sound drum is brought quickly up to, and maintained at, a rotational speed less than said predetermined speed and a frictional drag is applied to said sound drum during rotation thereof at said predetermined speed.

10. Apparatus for raising the speed of a shaft close up to, but slightly less than, a predetermined speed and for applying a drag to said shaft if it attains said predetermined speed, said apparatus, comprising, in combination,
(a) a first friction wheel mounted on said shaft,
(b) frictional drive means tending to rotate said first mentioned shaft at said predetermined speed,
(c) a power driven shaft,
(d) a second friction wheel mounted on said power driven shaft in proximity to said first friction wheel,
(e) a rotatable puck disposed for cooperation with said friction wheels by engagement therewith, the ratio of the diameters of said friction wheels being such that, when the periphery of said puck is in non-slipping engagement with the peripheries of said friction wheels, said first shaft will be driven at less than, but close to, said predetermined speed by said power driven shaft through said puck, and
(f) means for alternatively effecting non-slipping engagement of the periphery of said puck with the peripheries of said friction wheels and slipping engagement of the periphery of said puck with the peripheries of said friction wheels at different times, whereby the rotational speed of said first shaft will be slowed down if it exceeds said predetermined speed.

References Cited by the Examiner

UNITED STATES PATENTS

| 1,300,169 | 4/1919 | Hudson | 74—213 |
| 2,827,285 | 3/1958 | Thompson | 226—195 X |

OTHER REFERENCES

Siemens: German printed application 1,170,246, 5–1964.

M. HENSON WOOD, Jr., *Primary Examiner.*

J. N. ERLICH, *Assistant Examiner.*